(12) United States Patent  
Lovitt (10) Patent No.: US 11,997,454 B1  
(45) Date of Patent: May 28, 2024

(54) POWER EFFICIENT ACOUSTIC TRACKING OF SOUND SOURCES

(71) Applicant: META PLATFORMS TECHNOLOGIES, LLC, Menlo Park, CA (US)

(72) Inventor: Andrew Lovitt, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 394 days.

(21) Appl. No.: 17/368,509

(22) Filed: Jul. 6, 2021

(51) Int. Cl.
*H04R 1/40* (2006.01)
*G02B 27/01* (2006.01)
*H04R 3/00* (2006.01)

(52) U.S. Cl.
CPC .............. *H04R 1/406* (2013.01); *H04R 3/005* (2013.01); *G02B 27/0176* (2013.01); *H04R 2201/401* (2013.01)

(58) Field of Classification Search
CPC ... H04R 1/406; H04R 3/005; H04R 2201/401
USPC ........................ 381/92, 95, 93, 96, 300, 310
See application file for complete search history.

(56) References Cited

U.S. PATENT DOCUMENTS

| | | | | |
|---|---|---|---|---|
| 2020/0327277 A1* | 10/2020 | Rahman | ................ | G06F 3/0483 |
| 2020/0327877 A1* | 10/2020 | Tourbabin | .............. | H04R 3/002 |
| 2021/0029479 A1* | 1/2021 | Donley | ................ | H04R 29/005 |

\* cited by examiner

*Primary Examiner* — Thjuan K Addy
(74) *Attorney, Agent, or Firm* — Weaver Austin Villeneuve & Sampson LLP (57) ABSTRACT

A method of tracking sound sources in an environment by monitoring the local area with a primary sensor system comprising a microphone array. The location of sound sources in the local area are tracked using the monitored sound. If an ambiguity is determined in the tracked location of the sound source, a secondary sensor system is activated. The secondary sensor system has a larger power draw than the primary sensor system. The secondary sensor system determines the updated location of the sound source. The tracked location of the sound sources is updated to be the updated location. Once the location is updated, the secondary sensor system is deactivated.

20 Claims, 6 Drawing Sheets

FIG. 5

POWER EFFICIENT ACOUSTIC TRACKING OF SOUND SOURCES

FIELD OF THE INVENTION

This disclosure relates generally to object tracking and more specifically to power efficient acoustic tracking of sound sources.

BACKGROUND

Many technologies exist for tracking people in a local area. Cameras are typically used but have a downside of using a relatively large amount of power. Moreover, headsets are increasingly moving toward solutions that track people, objects, etc., in their local areas. But due to the relatively high power budget associated with cameras, conventional headsets are forced to include large batteries, limit use times, or have a hard wired solution.

SUMMARY

An audio system that uses power efficient acoustic tracking of sound sources is described. The audio system is integrated into a device (e.g., headset) that includes a primary sensor system and one or more secondary sensor systems. The one or more secondary sensor systems, while active, have a relatively higher power draw than a power draw of an active primary sensor system. The primary sensor system is configured to track sound sources acoustically in a local area of the audio system. The primary system includes a microphone array. The microphone array monitors sound from the local area, and the audio system uses the monitored sounds to track sound sources (e.g., people, cars, etc.) within the local area. Note that because the sound sources are being tracked with sound, there can be cases when there is some ambiguity in their location (e.g., a person stops speaking and then changes location within the local area). In these ambiguous situations, referred to as ambiguity conditions, the audio system can instruct the device to activate a secondary sensor system (e.g., a camera), of the one or more secondary sensor systems. The audio system uses information from the activated secondary sensor system to remedy the ambiguity by identifying the locations of the sound sources. The audio system may then instruct the device to deactivate the secondary sensor system, and the audio system reverts to relying on the primary sensor system to acoustically track the sound sources in the local area. Note that in some embodiments, some or all of the features of the device are part of the audio system.

In some embodiments a method is described. A primary sensor system monitors sound in a local area. The primary sensor system is a microphone array. A location of a sound source in the local area is tracked using the monitored sound. Responsive to determining an ambiguity condition in the tracked location, a secondary sensor system is activated. The secondary sensor system has a larger power draw than the primary sensor system. An updated location of the sound source is determined using the secondary sensor system. The tracked location is updated to be the updated location, and the secondary sensor system is deactivated.

In some embodiments, an audio system comprises a primary sensor system, secondary sensor system, and controller. The primary sensor system includes a microphone array for monitoring sound in a local area. The secondary sensor system has a higher power draw than the primary sensor system and monitors at least a portion of the local area. The controller of the audio system is configured to track sound source locations and determine ambiguity conditions. In response to an ambiguity condition the controller activates the secondary sensor system, and updates the tracked locations of sound sources, and deactivates the secondary sensor system.

In some embodiments, a non-transitory computer readable medium is configured to store program code instructions, that when executed by a processor, cause an audio system to perform steps comprising: monitoring, via a primary sensor system of the audio system, sound in a local area, wherein the primary sensor system is a microphone array. The steps further including tracking a location of a sound source in the local area using the monitored sound. And responsive to determining an ambiguity condition in the tracked location: activating a secondary sensor system, that has a larger power draw than the primary sensor system; determining an updated location of the sound source using the secondary sensor system; updating the tracked location to be the updated location; and deactivating the secondary sensor system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An audio system for power efficient acoustic object tracking is described. The audio system is integrated into a device (e.g., headset) that comprises at least a primary sensor system, one or more secondary sensor systems, and a controller. In some embodiments, the device may include a transceiver to communicatively couple with other devices.

The audio system enables a user of the audio system to hear augmented sound sources. Audio systems of this type may allow users to amplify audio from a specific source while attenuating interference from other sources. For example, the audio system can be used in crowded areas to allow the user to hear the specific voice of their friend above the rest of the noise of the crowd.

The audio system monitors sound within an area with a primary sensor system. The primary sensor system has a low power demand and includes a microphone array. As the primary sensor system monitors sound within the local area, the audio system controller tracks each sound source with a model of the local area. As the sound sources move and change, the model updates with their updated locations.

Ambiguity conditions can arise if sound sources in the local area move unexpectedly and cause the samples of the primary sensor system to fall below an accuracy threshold set by the controller. For example, if two sound sources move toward each other, the audio system may not be able to resolve sound from each individual source, making sensor system fall below the accuracy threshold. In another example, if a sound source is detected by the audio system it may be unclear if the sound source is new and has recently moved into the local area or if the sound source is a previously tracked sound source that has moved within the local area unexpectedly (i.e. outside of an expected location), causing the sensor system output to fall below the accuracy threshold of the system. When an ambiguity condition arises, a secondary sensor system with a larger power draw than the primary sensor system is activated. The secondary sensor system may comprise a camera or depth sensor. The secondary sensor system is active only momentarily to reduce its power draw. The system determines the updated location of the sound source or sources using the secondary sensor system and then deactivates the system.

The audio system communicates with other devices via a wireless connection. The audio system requests device locations and transmits its own location via a wireless transceiver. In this situation the audio system tracks devices outside of the local area of the primary sensor system.

The primary sensor system monitors sound in the local area acoustically. The primary sensor system includes a microphone array acting as audio sensors. The microphone array is configured to monitor sound within the local area. The primary sensor system, while active, has a first power draw (i.e., power consumed during operation).

The secondary sensor system monitors sound in the local area when the primary sensor system is unable to do so accurately. The secondary sensor system includes a camera or depth sensor that captures images of sound sources in an area or determines the distance of the device from sound sources in the area. The secondary sensor system is typically active momentarily and, when active, has a second power draw that is higher than the first power draw of the primary sensor system.

The controller controls the primary sensor system and the one or more secondary sensor systems. The controller uses inputs from the primary sensor system and the one or more secondary systems to track sound sources.

The wireless transceiver enables the audio system to communicate with other devices via a wireless connection such as Wi-Fi or Bluetooth. The transceiver transmits information such as device identity and location to other devices and can request that same information from other devices.

Many technologies exist for tracking sound sources, but most tend to rely on power-intensive sensors. For example, audio tracking can be accomplished with a camera that captures images every second to identify if a person is speaking based on whether or not image processing algorithms recognize that their mouth is open. While methods like these identify and track sound sources, they sample using power-intensive sensors and controllers. The result is that audio systems either have large batteries or relatively short use times, neither of which is desirable for the user.

By having a primary sensor system and one or more secondary sensor systems, the audio system enables power efficient audio tracking. The primary sensor system is active (i.e. powered on and taking samples of the local area) for the majority of time the audio system in use. The secondary sensor system is active only when the primary sensor system is unable to accurately sample the local area. While active, the primary sensor system consumes less power than the secondary sensor system consumes while it is active. Switching momentarily to the secondary sensor system to correct inaccuracies of the primary sensor system allows power savings by only utilizing the higher-demand system for short periods when necessary. With this method the audio system can be powered for longer by a smaller battery.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Figure 1A:
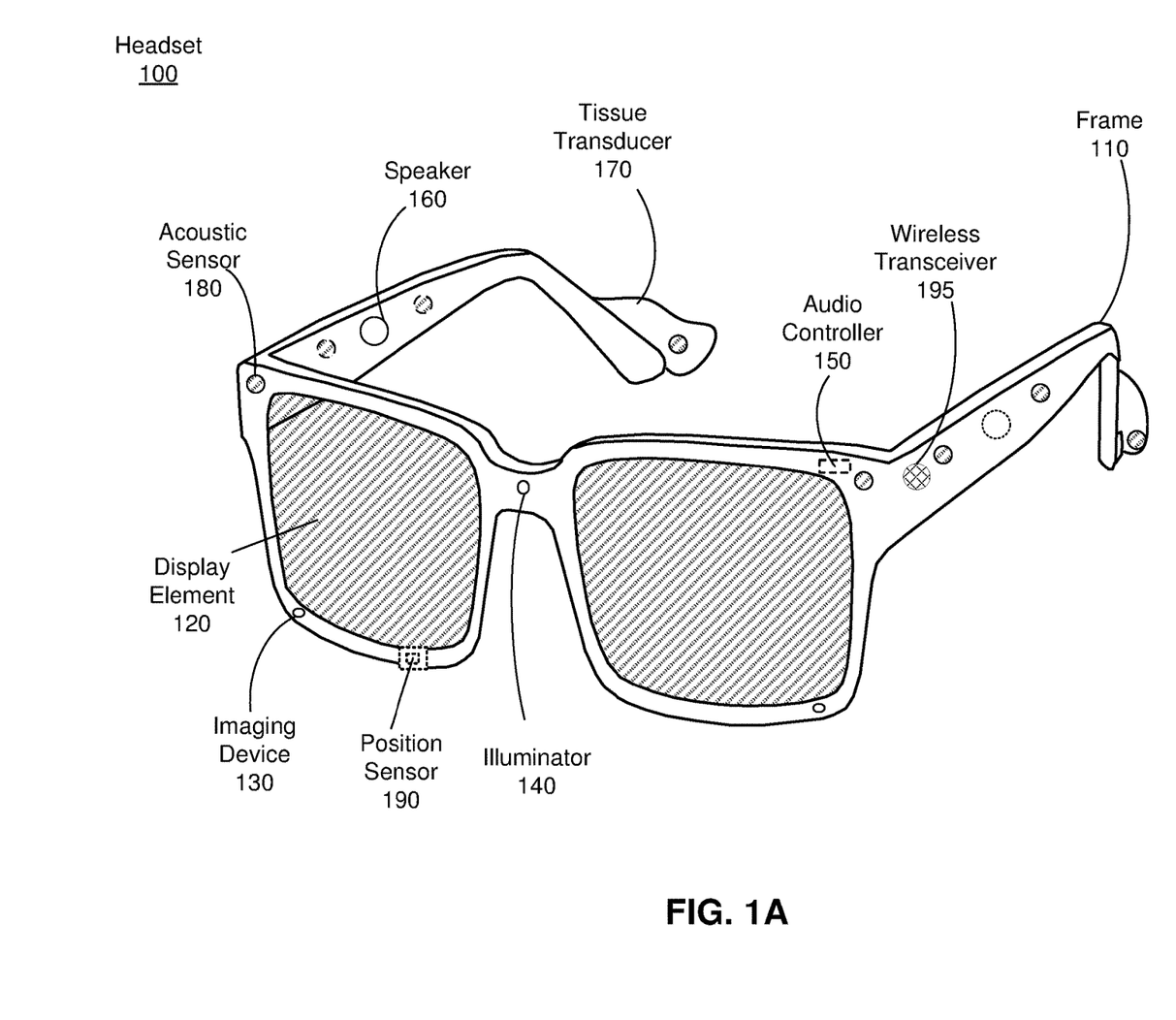
FIG. 1A is a perspective view of a headset implemented as an eyewear device, in accordance with one or more embodiments.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

A frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, earpiece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A) and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. In some embodiments, the sensor array may comprise sensors that are not part of the headset 100 but are in communication with the headset 100. For example, external sensors may be part of external devices comprising a mobile device, smartwatch, or earbuds. In this example, the external device may communicate with the headset 100 via wired or wireless transmission. The sensor array includes a plurality of acoustic sensors 180. An acoustic sensor 180 captures sounds emitted from one or more sound sources in the local area (e.g., a room). At least some of the plurality of acoustic sensors 180 form a primary sensor system of the audio system. Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array (e.g., the primary sensor system) that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof. The audio controller 150 interprets this information as a sound source getting further from the audio system and updates a model. The model may comprise a representation of the approximate location of sound sources, their previous positions, and their predicted directions of movement Predicted directions of movement may be based on the properties of the audio received from the sound source. For example, the audio controller 150 may recognize frequency changes of the received sound associated with the doppler effect or movement around a corner and predict the sound source's movement or position from based on those effects. The audio controller 150 may determine whether an ambiguity condition occurs. Additional details of the audio system are described below with regard to, e.g., FIGS. 2-4.

And responsive to determining an ambiguity condition occurs, the audio controller 150 activates a secondary sensor system (e.g., the DCA). The secondary sensor system may include, e.g., the position sensor 190, the wireless transceiver 195, the DCA, the PCA, or some combination thereof. The secondary sensor system (while active) has a larger power draw than the primary sensor system. The audio controller 150 determines an updated location of sound sources in the local area using the secondary sensor system and updates the tracked locations of the sounds sources to be the updated locations. Once the ambiguity condition is resolved, the audio controller 150 deactivates the secondary sensor system, and continues tracking the sound sources in the local area using the primary sensor system.

The wireless transceiver 195 transmits wireless signals and receives wireless signals from other devices. The wireless signals transmitted and received by the wireless transceiver 195 may comprise Bluetooth, Wi-Fi, or other signals. An audio system may receive a request from another device via a signal detectable by the wireless transceiver 195. Once the audio system receives a request for information from another device it transmits the requested information to the device using the wireless transceiver 198. The wireless transceiver 195 activity is dependent on the environment of the audio system. For example, if no other devices are detected nearby or if the audio system has not received any requests from other devices for a period of time, the wireless transceiver deactivates to save power. In a different environment in which the device is paired to another device or is frequently receiving requests from other devices, the wireless transceiver remains active.

The position sensor 190 generates one or more measurement signals in response to motion of the headset 100. The position sensor 190 may be located on a portion of the frame 110 of the headset 100. The position sensor 190 may include an inertial measurement unit (IMU) or global positioning system (GPS). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 100 from the sampled data. For example, the IMU integrates the measurement signals received from the accelerometers over time to estimate a velocity vector and integrates the velocity vector over time to determine an estimated position of a reference point on the headset 100. The reference point is a point that may be used to describe the position of the headset 100. The position sensor 190 may be located external to the IMU, internal to the IMU, or some combination thereof. A GPS sensor finds absolute position of the audio system based on connection to satellites while an IMU detects the relative position of the device by tracing movement of the device. The position sensor 190 communicates the relative and absolute location of the audio system to the audio controller 150 such that the audio controller 150 can update a model of the audio system's environment.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 5.

Figure 1B:
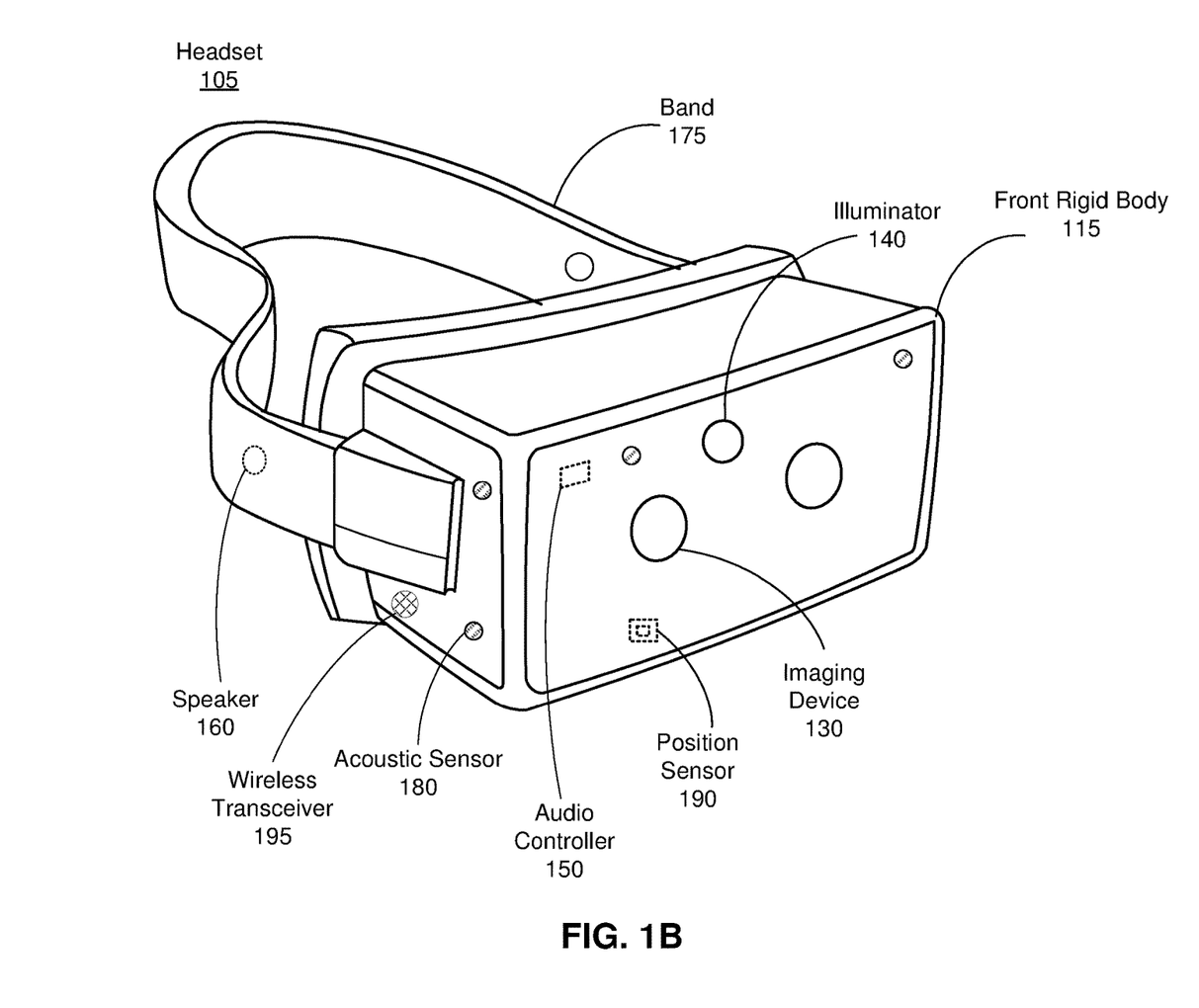
FIG. 1B is a perspective view of a headset implemented as a head-mounted display, in accordance with one or more embodiments.

FIG. 1B is a perspective view of a headset 105 implemented as an HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
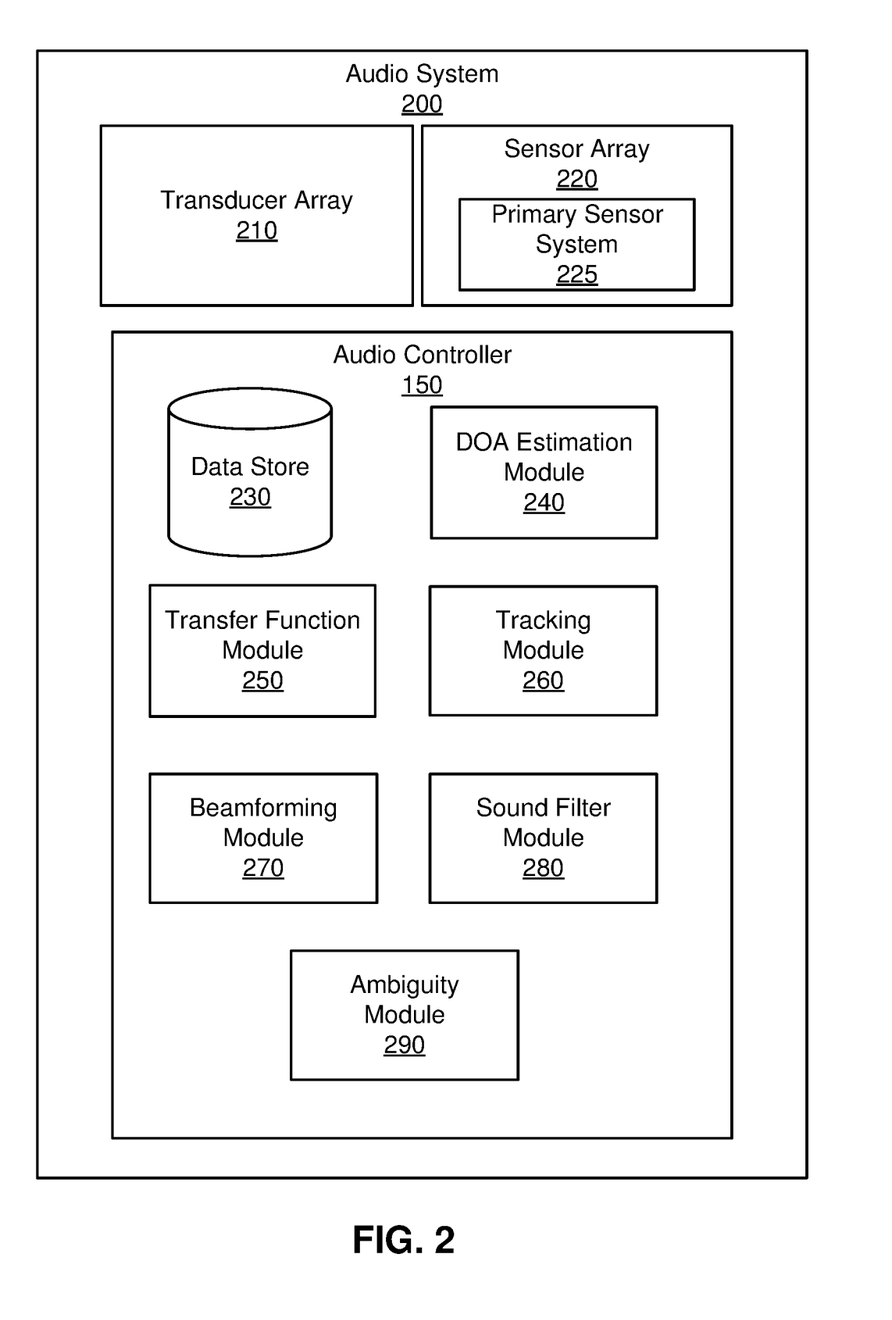
FIG. 2 is a block diagram of an audio system, in accordance with one or more embodiments.

FIG. 2 is a block diagram of an audio system 200, in accordance with one or more embodiments. The audio systems in FIG. 1A and FIG. 1B may be embodiments of the audio system 200. The audio system 200 is integrated into a device. The device may be, e.g., a headset (e.g., the headset 100, the headset 105), a smart phone, a tablet, some other device that includes one or more secondary sensor systems, or some combination thereof. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 150. Some embodiments of the audio system 200 have different components than those described here. Similarly, in some cases, functions can be distributed among the components in a different manner than is described here. For example, the audio system 200 may include one or more secondary sensor systems.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset and may be configured to be behind the auricle coupled to a portion of the user's skull. The bone conduction transducer receives vibration instructions from the audio controller 150 and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 150. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device.

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The sensor array 220 comprises the primary sensor system 225 for the audio system 200. In some embodiments, the audio system 220 is configured to interface with one or more secondary sensor systems (e.g., DCA or camera) on the device. Alternatively, a secondary sensor system may be part of the audio system 200.

The audio controller 150 controls operation of the audio system 200. In some embodiments, the audio controller 150 may also control aspects of operation from one or more other systems (e.g., a DCA, PCA, wireless transceiver, etc.) that are outside of the audio system 200. In the embodiment of FIG. 2, the audio controller 150 includes a data store 230, a DOA estimation module 240, a transfer function module 250, a tracking module 260, a beamforming module 270, and a sound filter module 280. The audio controller 150 may be located inside a headset, in some embodiments. Some embodiments of the audio controller 150 have different components than those described here. Similarly, functions can be distributed among the components in different manners than described here. For example, some functions of the controller may be performed external to the headset. The user may opt in to allow the audio controller 150 to transmit data captured by the headset to systems external to the headset, and the user may select privacy settings controlling access to any such data.

The data store 230 stores data for use by the audio system 200. Data in the data store 230 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 200, or any combination thereof. Data that is passed between systems of the audio system 200 is stored by the data store 230.

The user may opt-in to allow the data store 230 to record data captured by the audio system 200. In some embodiments, the audio system 200 may employ always on recording, in which the audio system 200 records all sounds captured by the audio system 200 in order to improve the experience for the user. The user may opt in or opt out to allow or prevent the audio system 200 from recording, storing, or transmitting the recorded data to other entities.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, a mapping server, a position sensor (e.g., the position sensor 190), etc.). The external system may create a virtual model of the local area, in which the local area and the position of the audio system 200 and sound sources within the local are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved or the audio system tracking the sound source moved. Using location data of the sound source and audio system an absolute mapping of the local area may be determined. In some embodiments, the tracking module 260 may use information (e.g., images of the local area, position information provided by devices within the local area, etc.) provided by one or more secondary sensor systems to track and update the position of sound sources within the local area. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The tracking module 260 may also estimate an expected location of a sound source. The expected location may within a threshold distance from a particular position. The expected location may also be along a path in which the sound source is expected to move based on current and previous location data.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 5).

The sound filter module 280 provides the sound filters to the transducer array 210. In some embodiments, the sound filters may cause positive or negative amplification of sounds as a function of frequency.

The ambiguity module 290 determines whether or not an ambiguity condition in a tracked location of a sound source occurs. An ambiguity condition describes a situation where there is some ambiguity in a location of a sound source tracked using the sensor array 220. The ambiguity may be such that the tracking module 260 is unable to provide a tracked location of a sound source within a threshold accuracy (e.g., within threshold distance of expected location).

An ambiguity condition may arise, for example, if a distance between two separate sound sources is smaller than a resolving distance of the sensor array 220. For example, two separate sound sources may move toward each other, and if the distance between them becomes less than the resolving distance, the sensor array 220 is unable to resolve them as two separate sound sources. Another ambiguity condition may arise, for example, if a sound source moves silently outside of its expected location and then begins to make sound again in a new location. Other conditions and environments that lead to ambiguities may occur. Further examples of how ambiguity conditions and how the audio system 200 resolves ambiguity conditions are discussed in detail below with regard to FIG. 3

Responsive to determining an ambiguity condition, the ambiguity module 290 selects a secondary sensor system to resolve the ambiguity condition. The secondary sensor system may be selected based on a type of ambiguity and/or environmental conditions. The ambiguity module 290 sends instructions to a secondary sensor system (e.g., a camera) to activate it temporarily. In some embodiments, the second sensor system provides locations of sound sources in the local area. In some embodiments, the secondary sensor system provide location data for potential sound sources, and the ambiguity module 290 reconciles the locations of the potential sound sources with the sound sources tracked by the primary sensor system and/or determines whether there are additional or fewer sound sources in the local area. In some embodiments, the ambiguity module 290 may determine that the secondary sensor system is not able to resolve the ambiguity condition. The ambiguity module 290 may then activate an additional secondary sensor system that has a larger power draw than the primary sensor system. The ambiguity module 290 may then determine a location of the sound source using the additional secondary sensor system, wherein the determined location is the updated location.

The ambiguity module 290 updates the tracked location of sound sources with the updated location of the sound source(s). The ambiguity module 290 uses the updated location of the sound source to check that the ambiguity condition has been resolved. The check is performed by the ambiguity module 290 by, for example, assessing if the updated location is within a threshold accuracy set by the controller (i.e. if the updated location is within a threshold distance of an expected location). If the updated location satisfies the threshold accuracy of the controller. then the ambiguity condition may be resolved. When the ambiguity condition has been resolved the ambiguity module 290 sends instructions for the secondary sensor system to deactivate. If the ambiguity condition is not resolved the ambiguity module 290 continues to check if the updated location provided by the secondary sensor system satisfies the accuracy threshold which may require several samples to be taken by the secondary sensor system and checked by the ambiguity module.

Figure 3:
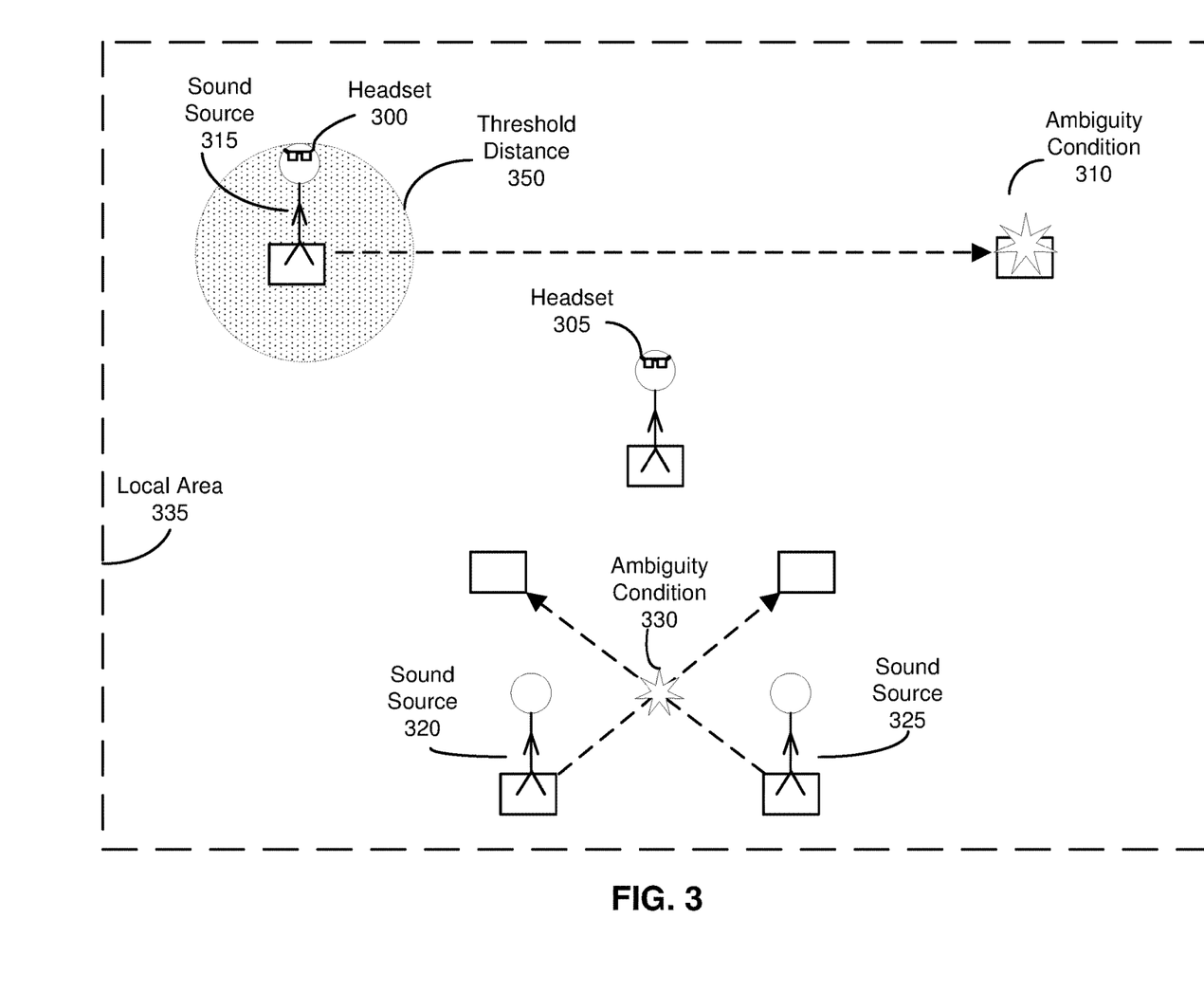
FIG. 3 is an illustration of various ways an ambiguity condition may be triggered, according to one or more embodiments

FIG. 3 is an illustration of various ways an ambiguity condition may be triggered, according to one or more embodiments. A wearer of a headset 305 is standing in an environment surrounded by the multiple sound sources 315, 320, and 325. The headset 305 may be an embodiment of the headset 100 or 105 and includes an audio system (e.g., the audio system 200 of FIG. 2). The headset 305 is active and using a primary sensor system of a sensor array (e.g., the sensor array 220) to monitor sound in a local area 335. An audio controller (e.g., the audio controller 150) of the headset uses samples collected by the primary sensor system to track sound sources 315, 320, and 325. An ambiguity condition describes a situation where there is some ambiguity in a location of a sound source tracked using the primary sensor system. For example, an ambiguity condition may occur sound source due to unexpected movement, interference, other complications, or some combination thereof.

In the case of a first ambiguity condition 330, sound sources 320 and 325 may be two people having a conversation with each other in the local area 335. The headset 305 monitors and tracks sound sources 320 and 325 with the primary sensor system. However, if the sound sources 320 and 325 get too closer to each other, for a particular distance from the headset 305, the primary sensor system may not be able to resolve sounds from the sound sources as originating from different locations (i.e., the sound source 320 or the sound source 325). This inability to resolve which sounds originate from which sound source causes the ambiguity condition 330. In some embodiments, the ambiguity condition 305 occurs while the headset 305 is using the primary sensor system (e.g., a microphone array) to monitor sound. The audio controller may use, e.g., DOA to determine locations of the sound sources 320 and 325. In response to the audio controller determining the ambiguity condition 330, the audio controller activates a secondary sensor system to re-locate the sound sources 320 and 325 for tracking. The secondary sensor system may include a camera or depth sensor that has a larger power draw than the sensors of the primary sensor system. The sensors of the secondary sensor system are able to track sound sources more accurately. In one embodiment the secondary sensor system may use one or more depth sensors to identify the distance of a sound source from the audio system and thus the location of the sound source. In another embodiment, the secondary sensor system may include a camera that captures images of the local area 335. And the audio controller and/or the secondary sensor system may use image processing techniques with facial recognition to locate and/or track a sound source within the local area 335 based on detection of a person's mouth moving or being open in images. The secondary sensor system locates the sound sources 320 and 325. The secondary sensor system communicates the location of the sound sources to the audio controller. The audio controller updates the location of the sound sources in a model and continues tracking them. Once the controller has re-established the location of the sound sources and resolves the ambiguity condition it deactivates the secondary sensor system, and monitoring/tracking of the sounds sources via the primary sensor system resumes.

A second ambiguity condition 310 may be triggered if the sound source 315 traverses the local area 335 while emitting no sound or emitting sound that is below a threshold value of detectability by the primary sensor system. This may occur, for example, if a sound source moves quietly and/or if there is background noise (e.g., fan may mask sound from the sound source 315) that renders the sound source undetectable by the primary sensor system. In this situation, the audio controller may update the model with a most recent tracked location of the sound source 315. But the sound source 315 may continue to move from that most recent tracked location or some new sound source may have entered the local area 335. And at some later instance in time, the primary sensor system may be able to detect sound from a sound source. If the new sound is within a threshold distance 350 from the last tracked location (or a predicted location for the sound source) and/or no more than a threshold amount of time has elapsed, the audio controller may update the position of the sound source 315 to the position associated with the new sound. The threshold distance 350 may be determined based on, e.g., a speed and direction of movement of the sound source 315. And in cases where the new sound is outside of the threshold distance 350 and/or more than the threshold amount of time has elapsed, the audio controller determines that an ambiguity condition 310 has occurred. For example, the new sound may be from a different sound source that entered the local area 335 or it may be from the sound source 315. The audio controller may activate the secondary sensor system to determine what sounds sources are present in the local area 335 and their locations, in order to resolve the ambiguity condition 310. And once the ambiguity condition is resolved, the audio system deactivates the secondary sensor system, and monitoring/tracking of the sounds sources via the primary sensor system resumes.

In some embodiments, the sound source 315 uses a device with transmitting and position sending capabilities (for example, the headset 300), then the ambiguity condition may be resolved differently. In this case, headset 305 may request a wireless connection with headset 300. Once the wireless connection is established between the headsets 300 and 305, one or both of the headsets can transmit their respective locations to the other headset to resolve the ambiguity condition 310. In some embodiments, the wireless connection between the devices may enable the devices to locate each other outside of the area of detection of the primary or secondary sensor system.

The audio system (e.g., audio system 200) of the headset 305 is configured to track multiple sound sources at once, as seen in the example causing ambiguity condition 330. For example, while the audio system resolves an ambiguity condition associated with a first sound source by activating the secondary sensor system, the audio system may also be monitoring a second sound source with the primary sensor system. In the embodiment described above in which the headset 305 has a wireless connection with another device, a sound source may be tracked outside of the areas of detection of the primary or secondary sensor systems while other sound sources within the areas of detection are monitored and tracked by the primary and secondary sensor systems.

Figure 4:
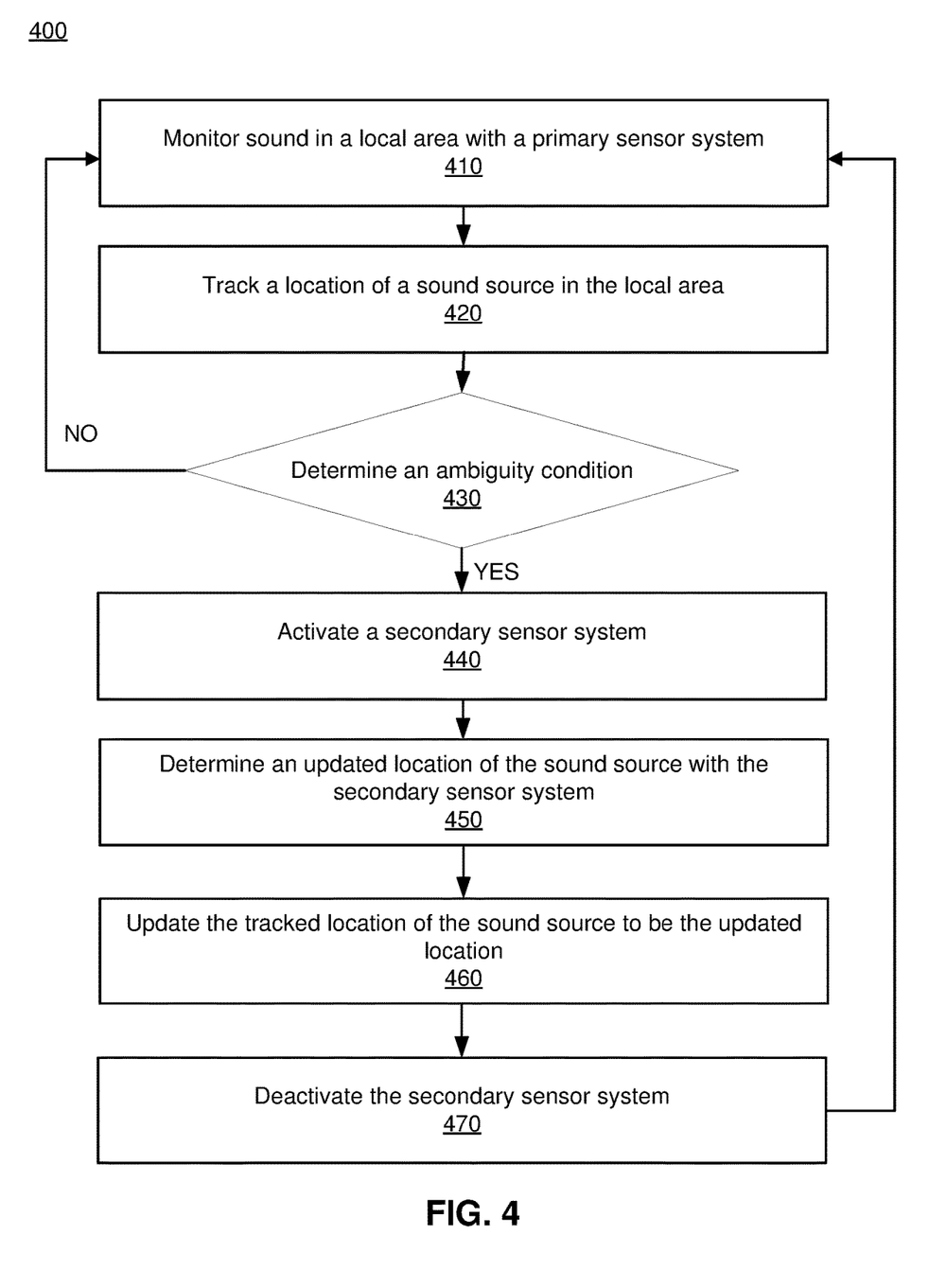
FIG. 4 is a flowchart illustrating a process for monitoring sound with an audio system in accordance with one or more embodiments.

FIG. 4 is a flowchart of a method 400 of monitoring sound, in accordance with one or more embodiments. The process shown in FIG. 4 may be performed by components of an audio system (e.g., audio system 200). Other entities may perform some or all of the steps in FIG. 4 in other embodiments. Embodiments may include different and/or additional steps or perform the steps in different orders.

The audio system monitors 410 sound in a local area with a primary sensor system (e.g., microphone array). The primary sensor system may comprise a microphone array or other audio-sensing mechanisms with a relatively low power input compared to other tracking systems like cameras. The audio system monitors 410 sound in the local area by receiving and processing samples from the primary sensor system. The primary sensor system may have an area of detection that defines the range of distance in which it can monitor sounds.

The audio system tracks 420 a location of a sound source in the local area. The audio system 200 uses samples from the primary sensor system that is monitoring the sound to create a model of the local area with positions of each sound source currently monitored by the system. The audio system tracks the sound sources by updating their locations in the model as the primary or secondary sensor system takes samples.

The audio system checks to determine 430 an ambiguity condition. The audio system determines 430 an ambiguity condition by checking if an accuracy value of the primary sensor system has fallen below a threshold value. If the accuracy value is below the threshold then then an ambiguity condition arises.

In the case that an ambiguity condition arises, the audio system activates 440 the secondary system such that the secondary sensor system can provide a more accurate sample of the location of sound sources for monitoring and tracking. For example, the audio system may activate one or more cameras that monitor the local area.

The audio system determines 450 an updated location of the sound source with the secondary sensor system (e.g., a camera). The secondary sensor system includes one or more sensors with higher power draw than those in the primary sensor system. The secondary sensor system receives instructions by an audio controller to monitor the local area and locate sound sources. This monitoring may involve capturing pictures, recording video, or other sampling methods. Once the sound sources are located by the secondary sensor system the location becomes the updated location of the sound sources.

In some embodiments, the audio system may determine that a location of the sound source determined by the secondary sensor system does not resolve the ambiguity condition. The audio system may then activate an additional secondary sensor system that has a larger power draw than the primary sensor system. The audio system may then determine a location of the sound source using the additional secondary sensor system, wherein the determined location is the updated location.

The audio system 200 updates 460 the tracked location of the sound source to be the updated location. Using the samples taken by the secondary sensor system, the audio system 200 updates the location of the sound sources in the model to be the updated location that was found by the secondary sensor system.

Once the ambiguity condition is resolved, the audio system deactivates 470 the secondary sound system. Updating the location of the sound sources resolves the ambiguity condition meaning that the audio system can go back to monitoring and tracking sound using the primary sensor system. Deactivating the secondary sensor system sending instructions via the audio controller to power off the secondary sensor system such that it is no longer drawing power from the audio system. The deactivation of the secondary sensor system saves power and sound sources can continue to be tracked by the low power primary sensor system.

Figure 5:
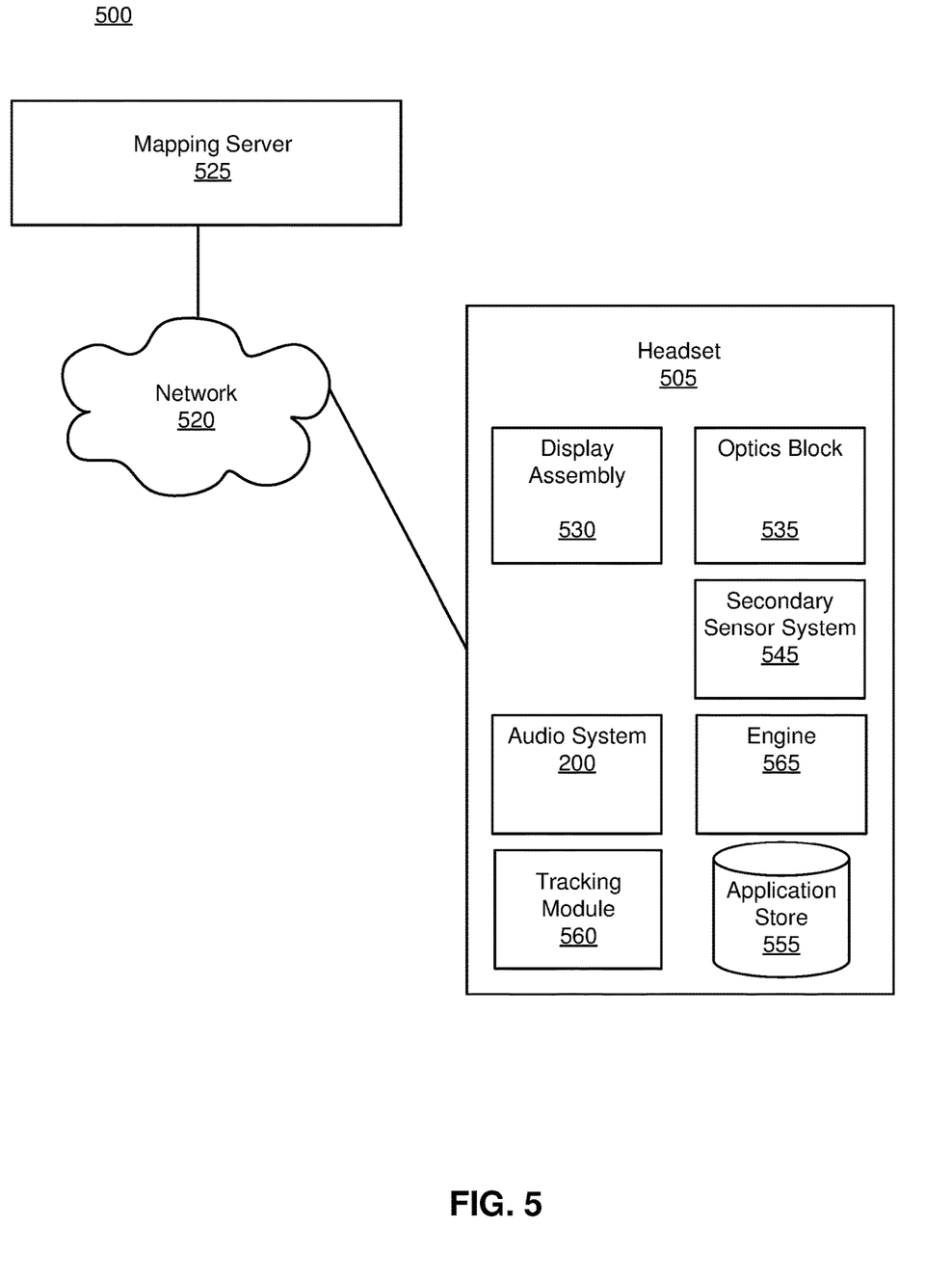
FIG. 5 is a diagram of a system environment, in accordance with one or more embodiments.

FIG. 5 is a system 500 that includes a headset 505, in accordance with one or more embodiments. In some embodiments, the headset 505 may be the headset 100 of FIG. 1A or the headset 105 of FIG. 1B. The system 500 may operate in an artificial reality environment (e.g., a virtual reality environment, an augmented reality environment, a mixed reality environment, or some combination thereof). The system 500 shown by FIG. 5 includes the headset 505, the network 520, and the mapping server 525. While FIG. 5 shows an example system 500 including one headset 505, in other embodiments any number of these components may be included in the system 500. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments.

The headset 505 includes the display assembly 530, an optics block 535, and the secondary sensor system 545. Some embodiments of headset 505 have different components than those described in conjunction with FIG. 5. Additionally, the functionality provided by various components described in conjunction with FIG. 5 may be differently distributed among the components of the headset 505 in other embodiments or be captured in separate assemblies remote from the headset 505.

The display assembly 530 displays the content using one or more display elements (e.g., the display elements 120). A display element may be, e.g., an electronic display. In various embodiments, the display assembly 530 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 535.

The optics block 535 may magnify image light received from the electronic display, corrects optical errors associated with the image light, and presents the corrected image light to one or both eyeboxes of the headset 505. In various embodiments, the optics block 535 includes one or more optical elements. Example optical elements included in the optics block 535 include: an aperture, a Fresnel lens, a convex lens, a concave lens, a filter, a reflecting surface, or any other suitable optical element that affects image light. Moreover, the optics block 535 may include combinations of different optical elements. In some embodiments, one or more of the optical elements in the optics block 535 may have one or more coatings, such as partially reflective or anti-reflective coatings.

Magnification and focusing of the image light by the optics block 535 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 535 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 535 corrects the distortion when it receives image light from the electronic display generated based on the content.

The secondary sensor system 545 may be used to determine positional information for sound sources in the local area. The secondary sensor system 545 may have an area of detection (may also be referred to as field of view) that determines the range of distance in which the secondary sensor system can detect sound sources. The area of detection may be larger or smaller than the local area. The secondary sensor system 545 may include, e.g., one or more DCAs, one or more cameras, one or more position sensors, a wireless transceiver, or some combination thereof. The secondary sensor system 545 may be part of a headset 505 or be part of an external device that is connected to the headset 505. For example, the secondary sensor system 545 may comprise a camera or DCA on a mobile device or smartwatch, the secondary sensor system 545 in communication with the headset 505. The secondary sensor system is activated by an ambiguity condition noted by the audio controller 150 of the audio system 200. In the embodiment in which the secondary sensor system is part of a headset, the secondary sensor system 545 captures samples of the local area's sound environment by taking depth measurements of objects near the headset 505 or capturing images of the area surrounding the headset 505. The secondary sensor system 545 processes the samples captured by the secondary sensor system to determine the location of objects in the local area and whether or not they are sound sources. Samples captured by the secondary sensor system 545 may additionally be processed by the audio controller 150 of the audio system 200, in one embodiment.

The audio system 200 provides audio content to a user of the headset 505. The audio system 200 is substantially the same as the audio system 200 describe above. The audio system 200 may comprise one or acoustic sensors, one or more transducers, and an audio controller. The audio system 200 may provide spatialized audio content to the user. In some embodiments, the audio system 200 may request acoustic parameters from the mapping server 525 over the network 520. The acoustic parameters describe one or more acoustic properties (e.g., room impulse response, a reverberation time, a reverberation level, etc.) of the local area. The audio system 200 may provide information describing at least a portion of the local area from e.g., the secondary sensor system 545 and/or location information for the headset 505 from a position sensor. The audio system may track sound sources near the headset 505 and model their positions. The audio system 200 may generate one or more sound filters using one or more of the acoustic parameters received from the mapping server 525 and use the sound filters to provide audio content to the user.

The application store 555 stores one or more applications. An application is a group of instructions, that when executed by a processor, generates content for presentation to the user. Content generated by an application may be in response to inputs received from the user via movement of the headset 505. Examples of applications include gaming applications, conferencing applications, video playback applications, or other suitable applications.

The tracking module 560 tracks movements of the headset 505 using information from the secondary sensor system 545, one or more position sensors, or some combination thereof. For example, the tracking module 560 determines a position of a reference point of the headset 505 in a mapping of a local area based on information from the headset 505. The tracking module 560 may also determine positions of an object or virtual object. Additionally, in some embodiments, the tracking module 560 may use portions of data indicating a position of the headset 505 from the position sensor as well as representations of the local area from the secondary sensor system 545 to predict a future location of the headset 505. The tracking module 560 provides the estimated or predicted future position of the headset 505 to the engine 565.

The engine 565 executes applications and receives position information, acceleration information, velocity information, predicted future positions, or some combination thereof, of the headset 505 from the tracking module 560. Based on the received information, the engine 565 determines content to provide to the headset 505 for presentation to the user. For example, if the received information indicates that the user has looked to the left, the engine 565 generates content for the headset 505 that mirrors the user's movement in a virtual local area or in a local area augmenting the local area with additional content.

The network 520 couples the headset 505 to the mapping server 525. The network 520 may include any combination of local area and/or wide area networks using both wireless and/or wired communication systems. For example, the network 520 may include the Internet, as well as mobile telephone networks. In one embodiment, the network 520 uses standard communications technologies and/or protocols. Hence, the network 520 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 520 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 520 can be represented using technologies and/or formats including image data in binary form (e.g., Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc.

The mapping server 525 may include a database that stores a virtual model describing a plurality of spaces, wherein one location in the virtual model corresponds to a current configuration of a local area of the headset 505. The mapping server 525 receives, from the headset 505 via the network 520, information describing at least a portion of the local area and/or location information for the local area. The user may adjust privacy settings to allow or prevent the headset 505 from transmitting information to the mapping server 525. The mapping server 525 determines, based on the received information and/or location information, a location in the virtual model that is associated with the local area of the headset 505. The mapping server 525 determines (e.g., retrieves) one or more acoustic parameters associated with the local area, based in part on the determined location in the virtual model and any acoustic parameters associated with the determined location. The mapping server 525 may transmit the location of the local area and any values of acoustic parameters associated with the local area to the headset 505.

One or more components of system 500 may contain a privacy module that stores one or more privacy settings for user data elements. The user data elements describe the user or the headset 505. For example, the user data elements may describe a physical characteristic of the user, an action performed by the user, a location of the user of the headset 505, a location of the headset 505, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 500 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
monitoring, via primary sensor system, sound in a local area, wherein the primary sensor system is a microphone array;
tracking a location of a sound source in the local area using the monitored sound; and
responsive to determining an ambiguity condition in the tracked location:
activating a secondary sensor system that has a larger power draw than the microphone array;
determining an updated location of the sound source using the secondary sensor system;
updating the tracked location to be the updated location; and
deactivating the secondary sensor system.

2. The method of claim 1 further comprising:
updating a model with the tracked location; and
wherein updating the tracked location to be the updated location comprises:
updating the tracked location in the model to be the updated location of the sound source.

3. The method of claim 1 wherein the secondary sensor system includes at least one of a camera, a depth sensing system, or a wireless transceiver.

4. The method of claim 1, wherein the ambiguity condition is a threshold period of time passing with sound from the sound source being below a threshold value.

5. The method of claim 1, wherein the ambiguity condition is sound occurring within the local area at least a threshold distance from an expected location of the sound source.

6. The method of claim 1, wherein the ambiguity condition is two sources of sound being located within a threshold distance from each other.

7. The method of claim 1 further comprising:
receiving, from an external device, a location request;
determining a location of an audio system that includes the primary sensor system and the secondary sensor system; and
providing the location to the external device.

8. The method of claim 1, wherein the sound source is associated with a personal device, and the secondary sensor system is a wireless transceiver that communicatively couples to an external device, the method further comprising:
sending, via the wireless transceiver, a request for the location of the external device, wherein a position sensor on the external device determines location of the external device;
receiving, via the wireless transceiver, the determined location of the external device; and
wherein determining the updated location of the sound source using the secondary sensor system comprises updating a model with the determined location of the external device.

9. The method of claim 1 further comprising:
tracking a location of a second sound source using the primary sensor system concurrently to tracking the location of the sound source using the secondary sensor system,
wherein the second sound source is outside of an area of detection of the secondary sensor system.

10. The method of claim 1, wherein determining the updated location of the sound source using the secondary sensor system further comprises:
determining that a location of the sound source determined by the secondary sensor system does not resolve the ambiguity condition;
activating an additional secondary sensor system that has a larger power draw than the primary sensor system; and
determining a location of the sound source using the additional secondary sensor system, wherein the determined location is the updated location.

11. A system comprising:
a primary sensor system comprising a microphone array configured to monitor sound in a local area;
a secondary sensor system configured to monitor at least a portion of the local area; and
a controller configured to:
track a location of a sound source using the monitored sound; and
in response to an ambiguity condition in the tracked location:
activate the secondary sensor system, wherein the secondary sensor system has a larger power draw than microphone array;
determine an updated location of the sound source using the secondary sensor system;
update the tracked location to be the updated location; and
deactivate the secondary sensor system.

12. The system of claim 11 wherein the controller is further configured to:
update a model with the tracked location; and
update the tracked location in the model to be the updated location of the sound source.

13. The system of claim 11 wherein the secondary sensor system is at least one of a camera, a depth sensing system, and a wireless transceiver.

14. The system of claim 11, wherein the ambiguity condition is a threshold of period of time passing with sound from the sound source being below a threshold value.

15. The system of claim 11, wherein the ambiguity condition is sound occurring within the local area at least a threshold distance from an expected location of the sound source.

16. The system of claim 11, wherein the ambiguity condition is two sources of sound being located within a threshold distance of each other.

17. The system of claim 11 further configured to:
receive, from an external device, a location request;
determine a location of an audio system that includes the primary sensor system and the secondary sensor system; and
provide the location to the external device.

18. The system of claim 11, wherein the sound source is associated with a personal device, and the secondary sensor system is a wireless transceiver that communicatively couples to an external device, the system further configured to:
send, via the wireless transceiver, a request for the location of the external device, wherein a position sensor on the external device determines location of the external device;
receive, via the wireless transceiver, the determined location of the external device; and
update a model with the determined location of the external device.

19. The system of claim 11 further configured to:
monitor a second sound source with the primary sensor system concurrently to monitoring a first sound source with the secondary sensor system.

20. A non-transitory computer readable medium configured to store program code instructions, which, when executed by a processor, cause an audio system to perform steps comprising:
monitoring, via a primary sensor system of the audio system, sound in a local area, wherein the primary sensor system is a microphone array;
tracking a location of a sound source in the local area using the monitored sound; and
responsive to determining an ambiguity condition in the tracked location:
activating a secondary sensor system that has a larger power draw than the microphone array;
determining an updated location of the sound source using the secondary sensor system;
updating the tracked location to be the updated location; and
deactivating the secondary sensor system.

* * * * *